US012561613B2

(12) United States Patent
Samulowitz et al.

(10) Patent No.: US 12,561,613 B2
(45) Date of Patent: Feb. 24, 2026

(54) DATA AUGMENTATION USING SEMANTIC TRANSFORMS

(71) Applicant: International Business Machines Corporation, Armonk, NY (US)

(72) Inventors: Horst Cornelius Samulowitz, Yorktown Heights, NY (US); Udayan Khurana, Yorktown Heights, NY (US); Kavitha Srinivas, Yorktown Heights, NY (US); Takaaki Tateishi, Tokyo (JP); Ibrahim Abdelaziz, Yorktown Heights, NY (US); Julian Timothy Dolby, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 18/051,900

(22) Filed: Nov. 2, 2022

(65) Prior Publication Data

US 2024/0144084 A1     May 2, 2024

(51) Int. Cl.
G06F 7/00         (2006.01)
G06N 20/00       (2019.01)
(52) U.S. Cl.
CPC .................................... G06N 20/00 (2019.01)
(58) Field of Classification Search
CPC ............. G06F 16/3347; G06F 16/3344; G06F 16/332; G06F 16/24542; G06F 16/2455;
(Continued)

(56) References Cited

U.S. PATENT DOCUMENTS

| | | | |
|---|---|---|---|
| 6,263,339 | B1 | 7/2001 | Hirsch |
| 6,741,974 | B1 | 5/2004 | Harrison et al. |

(Continued)

FOREIGN PATENT DOCUMENTS

| | | |
|---|---|---|
| CN | 108334321 A | 7/2018 |
| CN | 110134848 A | 8/2019 |

(Continued)

OTHER PUBLICATIONS

White, et al, "Deep Learning Code Fragments for Code Clone Detection", In Proceedings of the 31st IEEE/ACM International Conference on Automated Software Engineering, ACM, 2016, 12 pages.

(Continued)

*Primary Examiner* — Mohammad A Sana

(74) *Attorney, Agent, or Firm* — Cantor Colburn LLP; Jordan Schiller

(57)         ABSTRACT

A method of data augmentation includes receiving, by a processor, a set of data including a plurality of variables, mapping each variable to one or more target concepts associated with a name of each variable, and acquiring a set of semantic transforms, each semantic transform including a function applied to one or more concepts mapped to a respective variable. The method also includes comparing the one or more target concepts to the one or more concepts of each semantic transform, selecting at least one semantic transform based on the comparing, generating an expression for each selected semantic transform, each expression configured to apply a function of a selected semantic transform (Continued)

to at least one of the plurality of variables, and augmenting the set of data for use in an application by adding each expression to the set of data.

20 Claims, 3 Drawing Sheets

(58) Field of Classification Search
CPC ........... G06F 16/24522; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/285; G06F 16/9535; G06F 16/3329; G06F 16/90332; G06F 16/90335; G06F 16/217; G06F 16/353; G06N 5/04; G06N 5/01; G06N 5/022; G06N 20/00; G06N 20/20; G06N 5/018
See application file for complete search history.

(56) References Cited

U.S. PATENT DOCUMENTS

| | | | |
|---|---|---|---|
| 6,965,902 B1 | 11/2005 | Ghatate | |
| 7,530,054 B2 | 5/2009 | Reimer et al. | |
| 7,703,085 B2 | 4/2010 | Poznanovic et al. | |
| 7,984,422 B2 | 7/2011 | Graham | |
| 8,843,884 B1 | 9/2014 | Koerner | |
| 9,639,335 B2 | 5/2017 | Hoban et al. | |
| 9,658,839 B2 | 5/2017 | Hale et al. | |
| 9,959,326 B2 | 5/2018 | Duan et al. | |
| 10,073,763 B1 | 9/2018 | Raman et al. | |
| 10,229,200 B2 | 3/2019 | Bornea et al. | |
| 10,303,448 B2 | 5/2019 | Steven et al. | |
| 10,402,175 B2 | 9/2019 | Mcfarland | |
| 10,606,885 B2 | 3/2020 | Brundage et al. | |
| 11,003,994 B2 | 5/2021 | Liang et al. | |
| 11,954,424 B2 | 4/2024 | Samulowitz et al. | |
| 12,124,822 B2 | 10/2024 | Dolby et al. | |
| 2002/0062463 A1 | 5/2002 | Hines | |
| 2006/0294499 A1 | 12/2006 | Shim | |
| 2007/0088697 A1* | 4/2007 | Charlebois | G06F 8/443 |
| 2009/0119095 A1* | 5/2009 | Beggelman | G06F 40/30 704/9 |
| 2009/0234640 A1* | 9/2009 | Boegl | G06F 8/10 704/9 |
| 2010/0175049 A1 | 7/2010 | Ramsey et al. | |
| 2010/0287214 A1 | 11/2010 | Narasayya et al. | |
| 2011/0202559 A1 | 8/2011 | Todd | |
| 2012/0086547 A1 | 4/2012 | Foster et al. | |
| 2012/0233188 A1* | 9/2012 | Majumdar | G06F 16/355 707/756 |
| 2013/0086547 A1 | 4/2013 | Said et al. | |
| 2016/0315960 A1 | 10/2016 | Teilhet et al. | |
| 2017/0109933 A1 | 4/2017 | Voorhees et al. | |
| 2017/0221153 A1 | 8/2017 | Albright | |
| 2017/0255536 A1 | 9/2017 | Weissinger et al. | |
| 2019/0005163 A1 | 1/2019 | Farrell et al. | |
| 2019/0213185 A1* | 7/2019 | Arroyo | G06F 16/2428 |
| 2020/0110746 A1 | 4/2020 | Lecue et al. | |
| 2020/0143243 A1 | 5/2020 | Liang et al. | |
| 2020/0175163 A1 | 6/2020 | Hassanshahi et al. | |
| 2020/0210478 A1 | 7/2020 | Wada et al. | |
| 2020/0233889 A1 | 7/2020 | Nassar | |
| 2021/0064672 A1 | 3/2021 | Mahadi et al. | |
| 2021/0173641 A1 | 6/2021 | Dolby et al. | |
| 2021/0326312 A1 | 10/2021 | White | |
| 2021/0342723 A1 | 11/2021 | Rao | |
| 2023/0401467 A1* | 12/2023 | Ferrucci | G06F 16/3329 |

FOREIGN PATENT DOCUMENTS

| | | | |
|---|---|---|---|
| CN | 110362596 A | 10/2019 | |
| CN | 111091883 A | 5/2020 | |
| CN | 111353005 A | 6/2020 | |
| CN | 112287679 A | 1/2021 | |
| KR | 101505546 B1 | 8/2017 | |
| KR | 101762670 B1 | 8/2017 | |

OTHER PUBLICATIONS

Agesen, et al, "Type Inference of SELF Analysis of Objects with Dynamic and Multiple Inheritance", Journal of Software: Practice & Experience, vol. 25, 1995, 26 pages.

Allamanis, et al, "A Survey of Machine Learning for Big Code and Naturalness", Abstract Only, ACM Computing Surveys (CSUR), vol. 51, https://doi.org/10.1145/3212695, (Retrieved: Jan. 22, 2020), 2018, 5 pages.

Allamanis, et al, "Learning to Represent Programs with Graphs", arXiv preprint, 2018, 17 pages.

Alon, et al, "A General Path-Based Representation for Predicting Program Properties", arXiv preprint, 2018, 16 pages.

Alon, et al, "CODE2SEQ: Generating Sequences from Structured Representations of Code", arXiv preprint, 2019, 22 pages.

Bichsel, et al, "Statistical Deobfuscation of Android Applications", In Proceedings of the 2016 ACM SIGSAC Conference on Computer and Communications Security (CCS), 2016, 13 pages.

Bruch, et al, "Learning from Examples to Improve Code Completion Systems", In Proceedings of the 7th Joint Meeting of the European Software Engineering Conference and the ACM SIGSOFT Symposium on The Foundations of Software Engineering (ESEC/FSE), 2009, 11 pages.

Chae, et al., "Automatically Generating Features for Learning Program Analysis Heuristics for C-Like Languages", Proc. ACM Program. Lang., vol. 1, 2017, 25 pages.

Chambers, et al, "Iterative Type Analysis and Extended Message Splitting: Optimizing Dynamically-Typed Object-Oriented Programs", In Proceedings of the ACM SIGPLAN 1990 Conference on Programming Language Design and Implementation, 1990, pp. 150-164.

Dolby et al., "Mining Code Expressions for Data Analysis," U.S. Appl. No. 17/895,881, filed Aug. 25, 2022.

Feldthaus, et al, "Efficient Construction of Approximate Call Graphs for JavaScript IDE Services", In 35th International Conference on Software Engineering (ICSE), 2013, 10 pages.

Fernandes, et al., "Structured Neural Summarization", arXiv preprint, 2019, 18 pages.

Feurer, et al, "Using Meta-Learning to Initialize Bayesian Optimization of Hyperparameters", In Proceedings of the 2014 International Conference on Meta-learning and Algorithm Selection, vol. 1201, 2014, 8 pages.

Hsiao, et al, "Reducing MapReduce Abstraction Costs for Text-Centric Applications", In 43rd International Conference on Parallel Processing (ICPP), 2014, 10 pages.

Hu, et al, "CodeSum: Translate Program Language to Natural Language", arXiv preprint, http://www.arxiv-vanity.com/papers/1708.01837/, (Retrieved: Nov. 11, 2022), 19 pages.

Li, et al, "SySeVR: A Framework for Using Deep Learning to Detect Software Vulnerabilities", arXiv preprint, 2018, 13 pages.

List of IBM Patents or Patent Applications Treated as Related; Date Filed: Feb. 16, 2023, 2 pages.

Nguyen, et al, "Graph-based Mining of Multiple Object Usage Patterns", Abstract Only, In Proceedings of the 7th Joint Meeting of the European Software Engineering Conference and the ACM SIGSOFT Symposium on the Foundations of Software Engineering (ESEC/FSE), https://dl.acm.org/doi/abs/10.1145/1595696.1595767, (Retrieved: Jan. 22, 2020), 2009, 17 pages.

Nguyen, et al., "Graph-based Statistical Language Model for Code," In Proceedings of the 37th International Conference on Software Engineering (ICSE), vol. 1, 2015, 11 pgs.

Olson, et al., "Evaluation of a Tree-based Pipeline Optimization Tool for Automating Data Science", arXiv preprint, 2016, 8 pgs.

Proksch, et al., "Intelligent Code Completion with Bayesian Networks", Abstract Only, ACM Transactions on Software Engineering and Methodology (TOSEM), https://doi.org/10.1145/2744200, (Retrieved: Jan. 22, 2020), 2015, 5 pages.

(56)  References Cited

OTHER PUBLICATIONS

Samulowitz et al., "Automatic Domain Annotation of Structured Data," U.S. Appl. No. 17/661,619,238, filed May 2, 2022.

Shivers, "Control-Flow Analysis of Higher-Order Languages", Carnegie Mellon University, School of Computer Science, 1991, 200 pages.

"H2O AI Feature Store," Downloaded from the internet on Oct. 26, 2002; from h2o.ai/platform/ai-cloud/make/feature-store/; 5 pages.

Cambronero et al., "wranglesearch: Mining Data: Wrangling Functions from Python Programs [Under submission]," May 21, 2022; pp. 1-9.

Chen et al., Learning Semantic Annotations for Tabular Data. IJCAI 2019; 7 pages.

Chen et al., Colnet: Embedding the semantics of web tables for column type prediction. AAAI 2019; 8 pages.

Cremaschi et al. MantisTable: an Automatic Approach for the Semantic Table Interpretation. In SemTab@ ISWC. 2019; pp. 15-24.

Galhotra et al.; "Semantic Search over Structured Data." ACM CIKM; 2020; 4 pages.

Galhotra et al; "Automated Feature Enhancement for Predictive Modeling using External Knowledge;" IEEE ICDM; 2019; 4 pages.

Grigoriu, et al., "SIENA: Semi-automatic Semantic Enhancement of Datasets Using Concept Recognition", Journal of Biomedical Semantics, vol. 12, Article No. 5, Mar. 24, 2021, 12 pgs., <https://doi.org/10.1186/s13326-021-00239-z>.

Huynh, et al., "Dagobah: Enhanced Scoring Algorithms for Scalable Annotations of Tabular Data", SEMTAB 2020, Semantic Web Challenge on Tabular Data to Knowledge Graph Matching (SemTab 2020), co-located with the 19th International Semantic Web Conference (ISWC 2020), Nov. 5, 2020, Athens, Greece (Virtual Conference), Nov. 5, 2020, 13 pgs.

Jiménez-Ruiz et al; "SemTab2019: Resources to Benchmark Tabular Data to Knowledge Graph Matching Systems;"European Semantic Web Conference. Springer 2020; pp. 514-530.

Kanter et al., "Deep feature synthesis: Towards automating data science endeavors." 2015 IEEE international conference on data science and advanced analytics (DSAA). IEEE, 2015; 10 pages.

Katz et al., "Explorekit: Automatic feature generation and selection." 2016 IEEE 16th International Conference on Data Mining (ICDM). IEEE, 2016; 6 pages.

Khurana et al.; "Semantic Annotation for Tabular Data." ACM CIKM, 2021; 9 pages.

Khurana et al.; Feature Engineering for Predictive Modeling Using Reinforcement Learning; AAAI 2018; 8 pages.

Khurana, et al., "Semantic Annotation for Tabular Data", Dec. 15, 2020, 9 pgs., DOI: 10.48550/arxiv.2012.08594.

Limaye et al.; Annotating and searching web tables using entities, types and relationships; VLDB 2010; 10 pages.

M Hulsebos et all. Sherlock: A Deep Learning Approach to Semantic Data Type Detection. ACM SIGKDD 2019; 9 pages.

Mell et al., "The NIST Definition of Cloud Computing", National Institute of Standards and Technology, Special Publication 800-145, Sep. 2011, 7 pages.

Morikawa; 2019. Semantic Table Interpretation using LOD4ALL.. In SemTab@ ISWC. 49-56.

Namaki et al.; "Vamsa: Automated Provenance Tracking in Data Scient Scripts;" KDD 2020; Aug. 23-27, Virtual Event USA; 10 pages.

Neumaier et al; "Multi-level semantic labelling of numerical values;" In ICWS; 2016; 16 pages.

Nguyen et al; MTab: matching tabular data to knowledge graph using probability models arXiv preprint arXiv:1910.00246 (2019); 8 pages.

Oliveira et al.; ADOG-Annotating Data with Ontologies and Graphs.. In SemTab@ ISWC. 2019; pp. 6.

Ota et al.; Data Driven Domain Discovery for Structured Datasets. PVLDB (2020), pp. 953-965.

Ritze et al.; Matching html tables to dbpedia; In Proceedings of the 5th International Conference on Web Intelligence, Mining and Semantics, 2015; 6 pages.

Song; Autofe: efficient and robust automated feature engineering; Massachusetts Institute of Technology, 2018; 61 pages.

Srinivas et al.; Semantic Feature Discovery with Code Mining and Semantic Type Detection; AAAI; 2022; 3 pages.

Suhara, et al., "Annotating Columns with Pre-trained Language Models", Mar. 1, 2022, 15 pgs., arXiv:2104.01785.

Yan et al; "Synthesising Type-Detection Logic for Rich Semantic Data Types using Open-Source Code;" SIGMOD 18;Dated Jun. 10-15, 2018; 16 pages.

Yu et al.; "Deep Code Curator—Technical Report on Code2Graph," Apr. 2019, CECS Technical Report; Uniiverty of California, Irvine, 33 pages; 2019.

Zhang et al.; "Sato: Contextual Semantic Type Detection in Tables;" VLDB 2020; 14 pages.

Uren, Victoria, et al. "Semantic annotation for knowledge management: Requirements and a survey of the state of the art." Journal of Web Semantics 4.1 (2006): 14-28 (Year: 2006).

Karim Ali et al., "A Study of Call Graph Construction for JVM-Hosted Languages", Dec. 2021 IEEE, [Retrieved on Apr. 23, 2024], Retrieved from the internet: <URL: https://ieeexplore.ieee.org/stamp/stamp.jsp?tp=&arnumber=8944149> 23 Pages (2644-2666) (Year: 2021).

Khurana et al., "Semantic concept annotation for tabular data." Proceedings of the 30th ACM International Conference on Information & Knowledge Management. 2021 (Year: 2021), 10 pages.

Taheriyan, Mohsen, et al. "Learning the semantics of structured data sources." Journal of Web Semantics 37 (2016): 152-169 (Year:2016).

* cited by examiner

220

```
indian-liver-disease-modeling.py 1    import pandas as pd

2

3    def BMI(x, y):
4    :     return x/ (y**2)

5

6    df = pd.read_csv('diabetes.csv')
7    df ['BMI'] = df.apply_(lambda row :
8    :     BMI (row['ht'],
9    :     row['wt']), axis = 1)|
```

FIG. 2

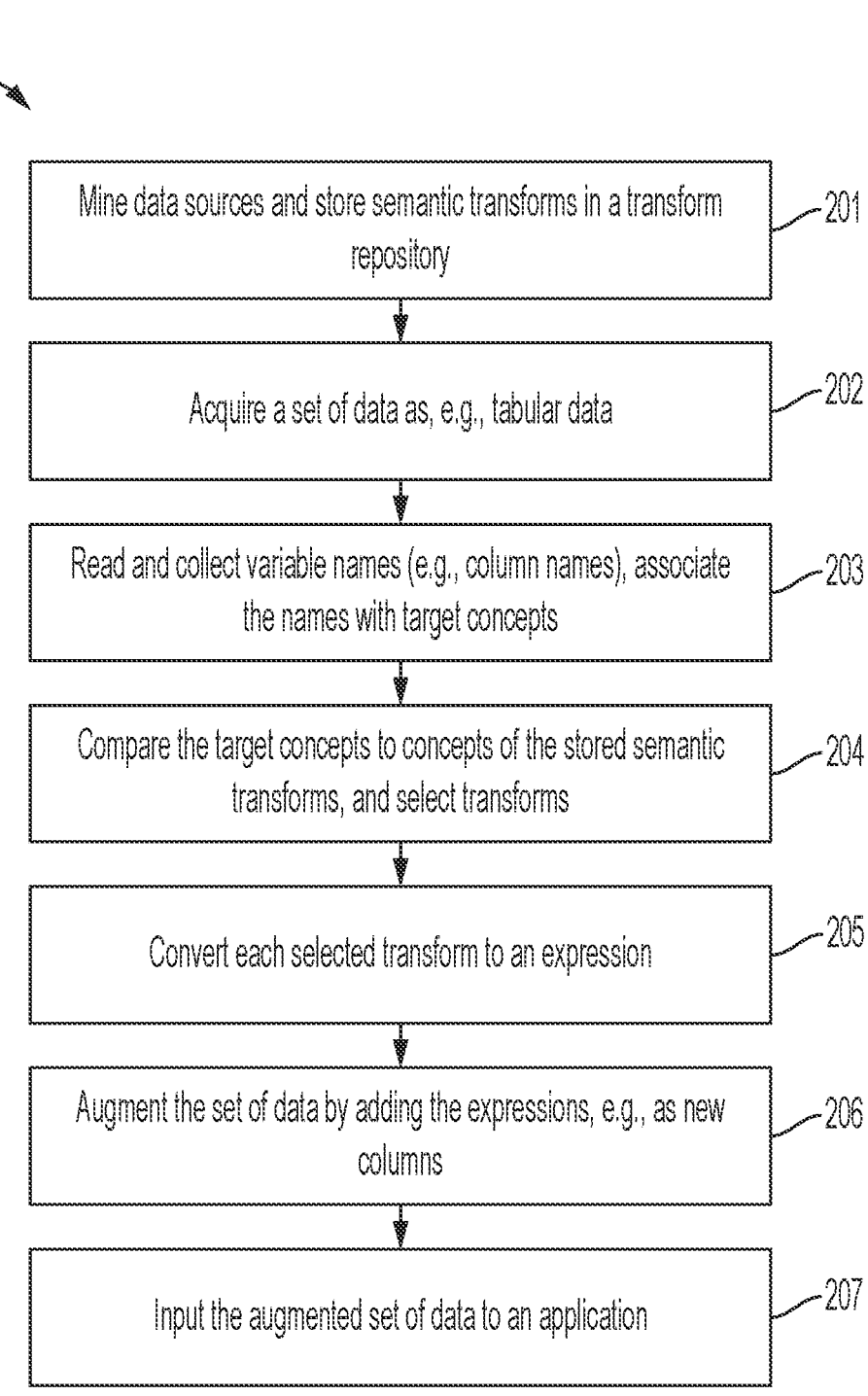

200

Mine data sources and store semantic transforms in a transform repository — 201

Acquire a set of data as, e.g., tabular data — 202

Read and collect variable names (e.g., column names), associate the names with target concepts — 203

Compare the target concepts to concepts of the stored semantic transforms, and select transforms — 204

Convert each selected transform to an expression — 205

Augment the set of data by adding the expressions, e.g., as new columns — 206

Input the augmented set of data to an application — 207

FIG. 3

DATA AUGMENTATION USING SEMANTIC TRANSFORMS

BACKGROUND

The present invention generally relates to computer technology, specifically, to data augmentation for use in machine learning and other applications.

Recent advancements in the fields of machine learning and artificial intelligence have provided new sets of tools that can be used to solve a variety of otherwise difficult or impossible problems. These tools now approach or even outperform humans and conventional computing systems in an increasingly wide range of tasks, such as, for example, in image evaluation (e.g., computer vision) and healthcare (e.g., automated diagnoses). Due to these successes, the use cases of ever more sophisticated machine learning and/or artificial intelligence-based systems and models has expanded rapidly.

Automatic machine learning can include several search processes, executed sequentially, that each consist of a set of iterations for finding the best values for a pipeline configuration (model configuration). Example stages during automatic machine learning can include estimator or model selection, optimization on selected models and feature engineering. Feature engineering includes mining features from program analysis of data to identify actionable transformations. Currently, feature engineering is mostly performed by humans to find useful features.

SUMMARY

One or more embodiments of the present invention are directed to a method of data augmentation that includes receiving, by a processor, a set of data including a plurality of variables, mapping each variable to one or more target concepts associated with a name of each variable, and acquiring a set of semantic transforms, each semantic transform including a function applied to one or more concepts mapped to a respective variable. The method also includes comparing the one or more target concepts to the one or more concepts of each semantic transform, selecting at least one semantic transform based on the comparing, generating an expression for each selected semantic transform, each expression configured to apply a function of a selected semantic transform to at least one of the plurality of variables, and augmenting the set of data for use in an application by adding each expression to the set of data.

One or more embodiments of the present invention are directed to a system that includes a memory device and one or more processing units coupled with the memory device. The one or more processing units are configured to perform a method of data augmentation. The method includes receiving a set of data including a plurality of variables, mapping each variable to one or more target concepts associated with a name of each variable, and acquiring a set of semantic transforms, each semantic transform including a function applied to one or more concepts mapped to a respective variable. The method also includes comparing the one or more target concepts to the one or more concepts of each semantic transform, selecting at least one semantic transform based on the comparing, generating an expression for each selected semantic transform, each expression configured to apply a function of a selected semantic transform to at least one of the plurality of variables, and augmenting the set of data for use in an application by adding each expression to the set of data.

One or more embodiments of the present invention are directed to a computer program product including a computer-readable memory that has computer-executable instructions stored thereupon. The computer-executable instructions, when executed by a processor, cause the processor to perform operations that include receiving a set of data including a plurality of variables, mapping each variable to one or more target concepts associated with a name of each variable, and acquiring a set of semantic transforms, each semantic transform including a function applied to one or more concepts mapped to a respective variable. The operations also include comparing the one or more target concepts to the one or more concepts of each semantic transform, selecting at least one semantic transform based on the comparing, generating an expression for each selected semantic transform, each expression configured to apply a function of a selected semantic transform to at least one of the plurality of variables, and augmenting the set of data for use in an application by adding each expression to the set of data.

Other embodiments of the present invention implement features of the above-described methods in systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2 depicts an example of a program for extracting data for use in embodiments described herein; and FIG. 3 depicts a flowchart of a method of analyzing and augmenting data for use in machine learning and artificial intelligence applications, according to one or more embodiments of the present invention.

Figure 1:
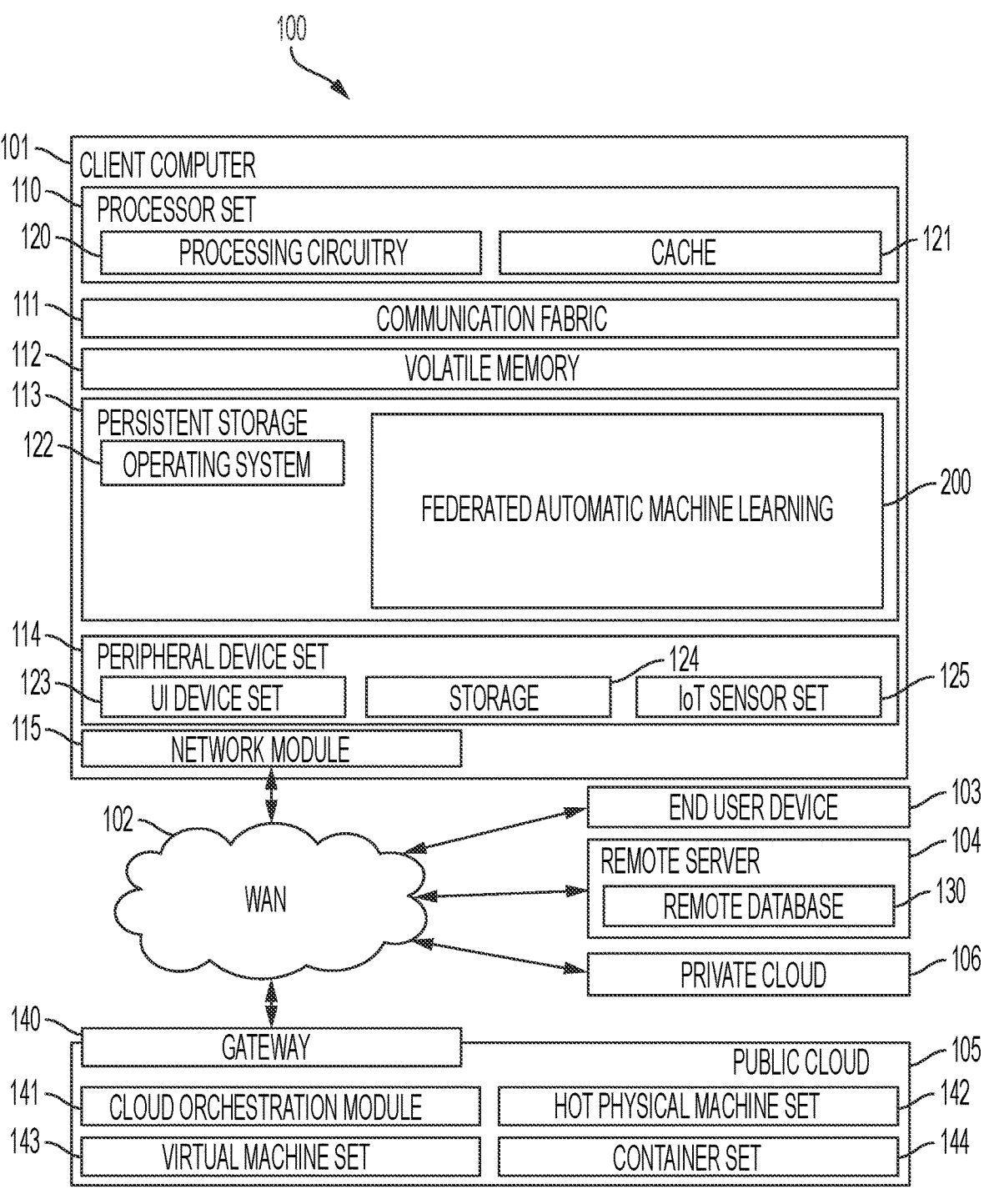
FIG. 1 depicts a computer system for performing aspects of one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention are directed to devices, systems, and methods for data augmentation. Data may be augmented as described herein by improving data sets provided to machine learning models, by adding feature transformations that can improve model performance. An embodiment of a method includes extracting or otherwise receiving a set of data, and mapping variables in the set of data to concepts (referred to herein as "target concepts"). A repository of stored semantic transforms is accessed, in which each stored transform includes a program or function to be applied to one or more variables. Each variable in a given transform is mapped to a concept.

The method also includes selecting one or more semantic transforms by comparing concepts in each transform to the target concepts. An expression is derived for each selected semantic transform by mapping the concepts therein to the names of variables (e.g., column-to-concept mapping), and each expression is added to the set of data. For example, a column for each expression is added, which includes a name of the expression and values calculated using the function associated with the expression.

One or more embodiments of the present invention are rooted in computing technology, and provide improvements to computing technology, particularly, data analysis and machine learning/artificial intelligences. For example, the embodiments described herein improve feature engineering by automating tasks of identifying relevant or useful transforms and applying such transforms to data sets. The embodiments can also provide the provenance of identified transforms and thereby provide explainability to users. The embodiments can improve other types of data analysis by providing expressions useful in data visualization and/or other analyses.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as federated automatic machine learning 200 (referred to herein as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

FIG. 2 depicts a flowchart of an embodiment of a method 200 of data augmentation for use in machine learning or artificial intelligence applications. The method 200 includes a number of steps or stages represented by blocks 201-207. It is noted that the method may include all of the steps or stages or fewer than all of the steps or stages.

The method 200 may be performed by any suitable computing device or system. For example, the method can be performed by the computer 101, the processor set 110 and/or the end user device 103.

At block 201, various data sources are mined and a set of semantic transforms is generated using the mined data. The semantic transforms are mapped to concepts and stored in a storage location (e.g., in the remote database 130) as a transform repository. Any suitable sources may be mined, including databases, computing platforms, books, code corpora, scientific papers and others. Each sematic transform applies a function to one or more variables and outputs a new variable or value. In an embodiment, each semantic transform is stored in the form of:

({(var, concept), . . . }, prog), where "var" refers a variables and "concept" refers to a concept associated with the variable. (var, concept) is a mapping from one or more variables to the set of concepts. "prog" refers a program that is parameterized with variables. A transform may include a plurality of (var,concept) pairs.

A semantic transform acts on concepts as noted above. An example of a transform is body mass index or "BMI", defined as BMI=weight/(height$^2$). In this example, the BMI transform is stored on the form of:

({(w, weight),(h,height)}, w/h$^2$).

Another example is "volume," defined as width*height*depth. Any number of semantic transforms may be acquired.

At block 202, a set of data is acquired from any suitable source. The set of data includes a set of variables and associated values. In an embodiment, the set of data is a set of tabular data that includes a column for each variable. Each column has a variable name (column name) and one or more values of the variable.

An example of a set of data is discussed in conjunction with FIG. 2. FIG. 2 illustrates an example of program code 220 used to extract data for analysis as described herein. The program code 220 is used to import a data library and extract data from the library in tabular form. In this example, the data is related to health data from a group of people and includes information such as height and weight, and indications of health conditions (e.g., heart disease and diabetes). The following table (Table 1) shows a portion of the tabular data of this example:

| Ht | Wt |
|---|---|
| 1.7 | 65 |
| 1.8 | 80 |

Table 1 includes two columns, in which a first column includes height values and is named "Ht." A second column includes weight values and is named "Wt."

At block 203, the tabular data is read and column names are collected (e.g., Ht and Wt). A column-concept mapping is applied to the column names to associate each column name with a concept (referred to as a "target concept"). For example, the name Ht is associated with the concept of "height" and the name Wt is associated with the concept of "weight." Mapping concepts to variables may be performed using any source of information, such as definitions and descriptions in materials associated with the data set, or external sources of information such as knowledge bases and business glossaries.

At block 204, one or more semantic transforms related to the target concept(s) are retrieved from the transform repository. The repository is queried to select semantic transforms based on a level of similarity between the target concepts and concepts of a given transform.

In an embodiment, semantic transforms are selected based on a matching ratio. A "matching ratio" associated with a transform is a ratio of a number of matching concepts in a transform (concepts that match a target concept) to a total number of concepts in the transform. Semantic transforms that having a matching ratio that is greater than or equal to the minimum matching ration are selected.

For example, in the case of the volume transform (volume=width*height*depth), the matching ratio is 0.67 (2/3). In the case of BMI, the matching ratio is one.

At block 205, each selected transform is converted to an expression. An "expression" refers to a function or program that is applied to one or more variables of the set of data. An expression is derived by mapping or correlating each concept in a stored semantic transform to a corresponding variable name or column name. In an embodiment, column-to-concept mapping is used to generate expressions.

For example, the conversion is performed by initially correlating each concept "C" in a transform to a variable name (or column name) "N", and generating a pair (N,C) for each correlated concept and column name. It is noted that a concept may be related to more than one variable, and thus may be included in multiple pairs. Likewise, a variable name may be related to more than one concept.

An empty mapping M={ } is created. For each pair (N,C), a relation C→{N} is added to the mapping M. If a concept C is already mapped to another column name (denoted "Ns'"), the relation C→{N} is replaced with the relation C→Ns'∪{N} (adding N to Ns').

For example, the concept of height is related to the variable Ht ("height"→{"Ht"}), generating a pair (Ht, height). The concept of length is related to Ht ("length"→{"Ht"}), generating a pair (Ht,length). The concept of number is related to both Ht and Wt ("number"→{"Ht, Wt"}).

To generate the expression, each concept C in a selected semantic transform is replaced by a variable name or column name N. For example, the transform BMI=weight/(height$^2$) includes the concepts of weight and height as discussed above. Weight is mapped to Wt (i.e., (Wt,weight)), and height is mapped to Ht (i.e., Ht,height). A mapping is created and the relations are used to replace the concepts in the BHI transform. The resulting expression is:

$$BMI(Ht, Wt) = Ht/(Wt)^2.$$

At block 206, the set of data is augmented by adding each expression thereto. In an embodiment, the set of data is augmented by adding a new column to the data for each expression. Each new column has a name of the expression, and the column is populated with values by calculating values of the expression.

The following table (Table 2) shows the tabular data of Table 1 as augmented:

| Ht | Wt | BMI(Ht, Wt) |
|-----|-----|-------------|
| 1.7 | 65 | 22.5 |
| 1.8 | 80 | 24.7 |

At block 207, the augmented set of data is input to a machine learning or artificial intelligence application. For example, the augmented set of data, including the expressions (and optionally the provenance of one or more expressions), are input as training data to train a machine learning or deep learning model.

Optionally, each expression is evaluated to determine whether the expression is useful for the data set and/or expected application. For example, an automated machine learning tool such as AutoAI may be used to evaluate the expressions. In addition, the expressions may be evaluated by creating a new machine learning model with the expressions, and comparing this to a similar model that does not have the expressions.

In addition, or alternatively, the augmented data set may be used to facilitate other forms of data analysis, such as visualization and data understanding. For example, an expression related to data skew (i.e., an indication of uneven distribution of data in table columns) may be derived and added to the augmented data set. This expression may be useful in facilitating analysis of the data set (and/or other sets of data in the library or other locations from which the data set was extracted), e.g., by adjusting a query plan. In addition, the expression may be useful in increasing efficiency and speed by reducing redundant operations. For example, a column skew expression may be added to the data set to alert a user that the data set has already been analyzed for skew. This information can be used by the user to avoid unnecessary skew analysis, and/or to help the user understand whether other sets of data have similar characteristics.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of data augmentation, comprising:
   receiving, by a processor, a set of data including a plurality of variables;
   mapping each variable to one or more target concepts associated with a name of each variable;

acquiring a set of semantic transforms, each semantic transform including a function applied to one or more concepts mapped to a respective variable;
   comparing the one or more target concepts to the one or more concepts of each semantic transform, and selecting at least one semantic transform based on the comparing;
   generating an expression for each selected semantic transform, each expression configured to apply a function of a selected semantic transform to at least one of the plurality of variables; and
   augmenting the set of data for use in an application by adding each expression to the set of data.

2. The method of claim 1, wherein the application includes a machine learning application.

3. The method of claim 1, wherein the set of semantic transforms is stored in a transform repository, each semantic transform including a function indexed to one or more concepts.

4. The method of claim 3, wherein acquiring the set of semantic transforms includes selecting the set of transforms from the repository based on a level of similarity between a stored semantic transform and a target concept.

5. The method of claim 1, wherein the set of data includes tabular data having a column associated with each variable, and augmenting the set of data includes creating a new column for each expression.

6. The method of claim 5, wherein the new column is indexed based on the name of at least one variable and includes values calculated based on the expression.

7. The method of claim 1, wherein generating the expression includes replacing each concept in a selected semantic transform with a variable name associated with the concept.

8. A system comprising:
   a memory device; and
   one or more processing units coupled with the memory device, the one or more processing units are configured to perform a method of data augmentation, the method comprising:
   receiving a set of data including a plurality of variables;
   mapping each variable to one or more target concepts associated with a name of each variable;
   acquiring a set of semantic transforms, each semantic transform including a function applied to one or more concepts mapped to a respective variable;
   comparing the one or more target concepts to the one or more concepts of each semantic transform, and selecting at least one semantic transform based on the comparing;
   generating an expression for each selected semantic transform, each expression configured to apply a function of a selected semantic transform to at least one of the plurality of variables; and
   augmenting the set of data for use in an application by adding each expression to the set of data.

9. The system of claim 8, wherein the set of semantic transforms is stored in a transform repository, each semantic transform including a function indexed to one or more concepts.

10. The system of claim 9, wherein acquiring the set of semantic transforms includes selecting the set of transforms from the repository based on a level of similarity between a stored semantic transform and a target concept.

11. The system of claim 8, wherein the set of data includes tabular data having a column associated with each variable.

12. The system of claim 11, wherein augmenting the set of data includes creating a new column for each expression.

13. The system of claim 12, wherein the new column is indexed based on the name of at least one variable and includes values calculated based on the expression.

14. The system of claim 8, wherein generating the expression includes replacing each concept in a selected semantic transform with a variable name associated with the concept.

15. A computer program product comprising a computer-readable memory that has computer-executable instructions stored thereupon, the computer-executable instructions when executed by a processor cause the processor to perform operations comprising:

receiving a set of data including a plurality of variables;

mapping each variable to one or more target concepts associated with a name of each variable;

acquiring a set of semantic transforms, each semantic transform including a function applied to one or more concepts mapped to a respective variable;

comparing the one or more target concepts to the one or more concepts of each semantic transform, and selecting at least one semantic transform based on the comparing;

generating an expression for each selected semantic transform, each expression configured to apply a function of a selected semantic transform to at least one of the plurality of variables; and augmenting the set of data for use in an application by adding each expression to the set of data.

16. The computer program product of claim 15, wherein the set of semantic transforms is stored in a transform repository, each semantic transform including a function indexed to one or more concepts.

17. The method of claim 16, wherein acquiring the set of semantic transforms includes selecting the set of transforms from the repository based on a level of similarity between a stored semantic transform and a target concept.

18. The computer program product of claim 15, wherein the set of data includes tabular data having a column associated with each variable.

19. The computer program product of claim 18, wherein augmenting the set of data includes creating a new column for each expression, and the new column is indexed based on the name of at least one variable and includes values calculated based on the expression.

20. The computer program product of claim 15, wherein generating the expression includes replacing each concept in a selected semantic transform with a variable name associated with the concept.

\* \* \* \* \*